S. N. BLOOMDALE.
SPRING HUB.
APPLICATION FILED MAR. 21, 1921.

1,430,002.

Patented Sept. 26, 1922.

INVENTOR.
SETH N. BLOOMDALE.
BY *Southgate & Southgate*
ATTORNEYS.

Patented Sept. 26, 1922.

1,430,002

UNITED STATES PATENT OFFICE.

SETH N. BLOOMDALE, OF WORCESTER, MASSACHUSETTS.

SPRING HUB.

Application filed March 21, 1921. Serial No. 453,910.

*To all whom it may concern:*

Be it known that I, SETH N. BLOOMDALE, a subject of the King of Sweden (who has taken out his first papers), residing at Worcester, in the county of Worcester and State of Massachusetts, have invented a new and useful Spring Hub, of which the following is a specification.

This invention relates to a hub for a vehicle wheel and the principal objects thereof are to provide a yielding hub which will eliminate the necessity of a pneumatic tire on the wheel of an automobile truck or the like, and at the same time provide positive means for driving the wheel for the hub; also to provide a construction in which the amount of resiliency can be adjusted to make it suitable for use with different kinds of vehicles or for light and heavy loads. The invention also involves a construction which is simple, easily assembled, and of great durability.

Reference is to be had to the accompanying drawings, in which

Figure 1:
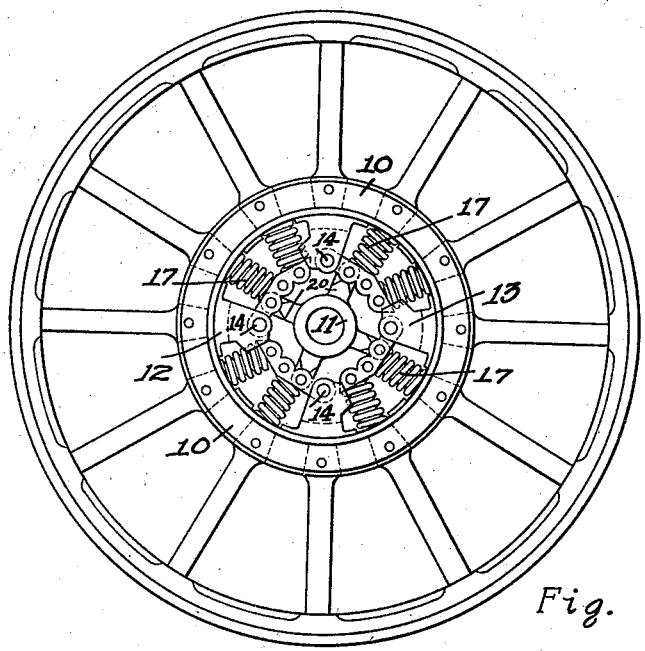
Fig. 1 is a side view of a wheel constructed in accordance with this invention.
Figure 2:
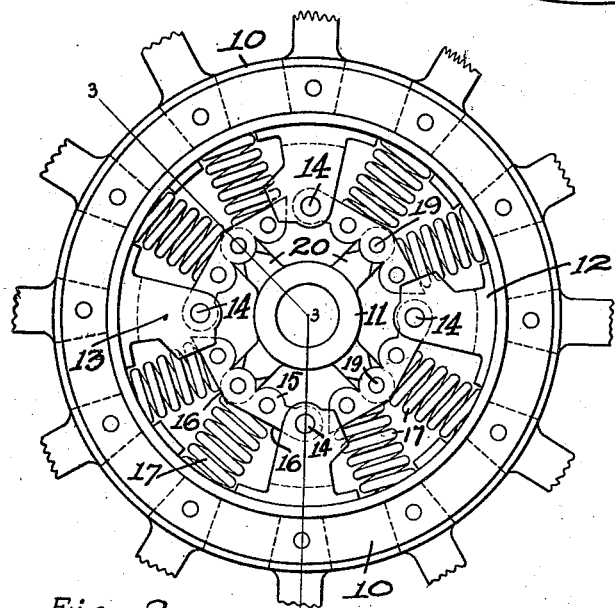
Fig. 2 is a similar view of the hub on enlarged scale showing the parts adjusted for a lighter load.

I am aware of the fact that many attempts have been made to produce spring wheels for the purpose of avoiding the expense and disadvantages of the ordinary pneumatic tire. These have been failures heretofore, so far as I am aware, due to the fact that the springs are made in such a way that they had to bend back and forward and thus fatigue the metal and cause it to break after a short period and also to the fact that it has seemed to be a difficult matter to provide yielding connections with a positive drive. Many of them were extremely complicated and if any adjusting devices were provided they added materially to the complication. This invention is designed to do away with these difficulties or to materially reduce them.

I have shown it in a form in which it is located in the hub of the wheel, this hub being formed of two parts, an outer ring 10 and an inner ring 11. The outer ring may be connected with the spokes in any desired way and is rigidly connected with the rim, so as to form a single structure therewith. It is shown as provided with a plurality of internal brackets or arms 12 each one perforated so as to have an internal space and provided with spaced side walls 13. These walls in each case support a pivot pin 14 that extends across from one to the other. These walls 13 extend from the inside of the outer ring 10 inwardly directly in a radial direction and the pins 14 extend across parallel with the axis of the wheel.

To each of the pins 14 is pivoted a lever 15 which extends from the pivot in a substantially circumferential direction. These levers project between the two sides 13 and each one is provided with one or more surfaces 16 against which two springs 17 bear at their ends. These springs bear at their outer ends on the inside of the ring 10 and they are arranged substantially radially. I have shown two of them for each of the levers 15 and I have shown four of these levers and four of the brackets or arms 12. It will be understood that it is within the scope of this invention, as expressed in the claims, to provide a different number of levers and a different number of springs for each lever. Each one of the levers 15 projects at its end between the two sides 13 of the next bracket 12 which constitute side guides for it. In this way the levers 15 are not only pivotally connected with the ring 10 by their pivot pins but they are also securely guided at their outer ends.

Each of the levers is provided with two or more transverse perforations parallel with the pins 14 through which pivot pins 19 are passed to positively connect the levers 15 with one of a corresponding number of rigid arms 20 projecting from the inner ring 11 to a point about as far from the center of the wheel as the inner ends of the arms 12. These pins 19 can be removed and the whole wheel turned with respect to the inner ring 11 so as to permit of connecting the arms 20 with the levers 15 at different distances from the pivots 14 thereof. In this way the device can be adjusted for carrying a heavier or lighter load.

Figure 3:
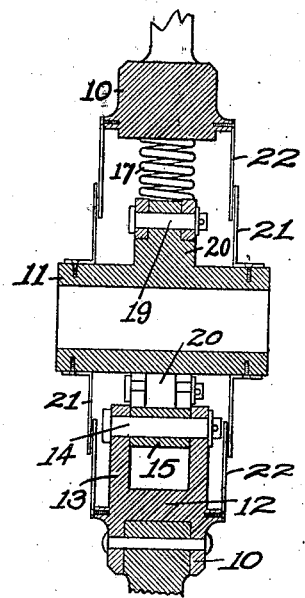
Fig. 3 is a sectional view on the line 3—3 of Fig. 2 showing a shield in addition.

In Fig. 3 only I have shown plates 21 and 22 of annular form for protecting the parts above described. In this case the plates 21 are secured to the inner ring or hub 11 while the plates 22 are secured to the sides of the outer ring 10. They are arranged in telescopic relation as will be obvious.

It will be seen that in all different positions in which the wheel may be located the weight on the axle is transmitted through one or two of the arms 20 through the corresponding number of levers 15 and from there through the springs 17 to the rigid ring 10. This gives a yielding action and cushions the blows received by the rim of the wheel so that the axle will ride with comparative steadiness. At the same time the circumferential pull is transmitted from the hub 11 through its rigid arms 20 to the levers 15 which move along circumferentially. This motion is then transmitted positively through the brackets 12 to the outer ring 10 of the hub. In other words this turning motion is transmitted positively without the resistance of the springs but radial motion is transmitted yieldingly without affecting the transmission of motion circumferentially. In this way the pull of the motor through the wheel does not tend to wear out the springs, bend them back and forth, or vibrate them. Also the pull of the tire on a wheel running idly will not have any such effect. The only strain on the springs comes from the vertical motion. This is cushioned effectively and in an extremely simple manner. It will be understood that the ends of the springs can be held against the parts on which they bear in any desired way. I have not thought it necessary to illustrate or describe any particular means of holding them for several well known forms can be used. They are easily replaceable.

Although I have illustrated and described only a single form of the invention, I am aware of the fact that many modifications can be made therein by any person skilled in the art without departing from the scope of the invention as expressed in the claims. Therefore, I do not wish to be limited to all the details of construction therein shown and described or to the particular numbers of parts illustrated, but what I do claim is:—

1. In a wheel, the combination of a hub having an outer ring rigidly connected with the rim and an inner ring constituting the hub proper, positive means for transmitting motion between the two rings in a circumferential direction and in either direction circumferentially and radial compression springs connected with the positive means for transmitting radial motion.

2. In a resilient wheel, the combination with a rim, a ring inside it, and spokes rigidly connecting the ring with the rim, of an inner ring, an arm projecting radially outward from said inner ring, a rigid arm projecting inward radially from the outer ring, the ends of said arms extending to about the same distance from the center, and a lever positively connected with said arms for transmitting motion from one to the other circumferentially, the lever having means by which the radial arms are adjustably connected with it at different points along it.

3. In a wheel, the combination with a rim, and ring inside it, rigidly connected with the rim, of an inner ring, arms projecting radially from said inner ring, arms projecting inwardly in a radial direction from the outer ring, the ends of said arms extending to about the same distance from the center, a lever positively connected with the said arms for transmitting motion from one to the other circumferentially, and yielding means extending radially for cushioning the motion of the pivoted lever toward and from the center of the wheel.

4. In a wheel, the combination of a hub having an outer ring and an inner ring or hub proper, with a series of arms projecting radially and rigidly from the inner ring, a corresponding number of arms projecting inwardly from the outer ring to about the same distance from the center as the ends of the first named arms, a lever connected with one of each of said sets of arms for transmitting circumferential motion from one to the other, and springs between said outer ring and each of the levers for cushioning the motion in a radial direction.

5. In a wheel, the combination of a ring rigidly connected with the rim, a hub proper located inside it, a series of bifurcated arms extending inwardly from said ring, a corresponding number of substantially tangential levers each pivoted to one of the arms and located between the two walls thereof and projecting from the point of pivotal support, their ends entering between the sides of the next radial arm to guide them, means for connecting the hub with said levers and springs for cushioning the motion of the levers.

In testimony whereof I have hereunto affixed my signature.

SETH N. BLOOMDALE.